United States Patent [19]
Folmar

[11] Patent Number: 5,950,980
[45] Date of Patent: Sep. 14, 1999

[54] PAD FOR AIR CONDITIONER COMPRESSOR

[76] Inventor: Charles R. Folmar, P.O. Box 1114, Kennedale, Tex. 76060

[21] Appl. No.: 08/790,331

[22] Filed: Jan. 28, 1997

[51] Int. Cl.[6] .................................................... F16M 1/00
[52] U.S. Cl. ............................................ 248/678; 248/679
[58] Field of Search ..................... 248/678, 679, 248/346.01, 346.02, 633

[56] References Cited

U.S. PATENT DOCUMENTS

| | | | |
|---|---|---|---|
| 1,666,149 | 4/1928 | Rosenzweig . | |
| 3,722,845 | 3/1973 | Unger | 248/679 |
| 3,790,115 | 2/1974 | Fox et al. | 248/679 |
| 3,904,158 | 9/1975 | Michael | 248/23 |
| 4,243,197 | 1/1981 | Wright | 248/678 |
| 4,916,918 | 4/1990 | Marelli | 62/259.1 |
| 5,076,534 | 12/1991 | Adam | 248/678 |
| 5,197,707 | 3/1993 | Kohan | 248/638 |
| 5,277,395 | 1/1994 | Smith et al. | 248/679 |

*Primary Examiner*—Ramon O. Ramirez
*Assistant Examiner*—Anita M. King
*Attorney, Agent, or Firm*—Arthur F. Zobal

[57] ABSTRACT

The pad of the invention has a first set of spaced apart side members and a second set of spaced apart side members with the ends of adjacent members coupled together to form an opening between the four side members. Preferably the side members are formed of concrete. The side members have metal rods embedded therein with the ends of adjacent rods connected together. One or two parallel connecting members with metal rods may be connected to either of the two sets of side members in the opening or crossed connecting members with metal rods may be connected together and to the two sets of side members in the opening. In another embodiment the members of the pad may be formed of a hard plastic material or synthetic rubber.

14 Claims, 4 Drawing Sheets

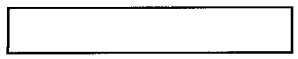
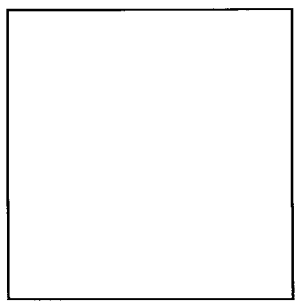
Fig. 1
PRIOR ART
Fig. 2
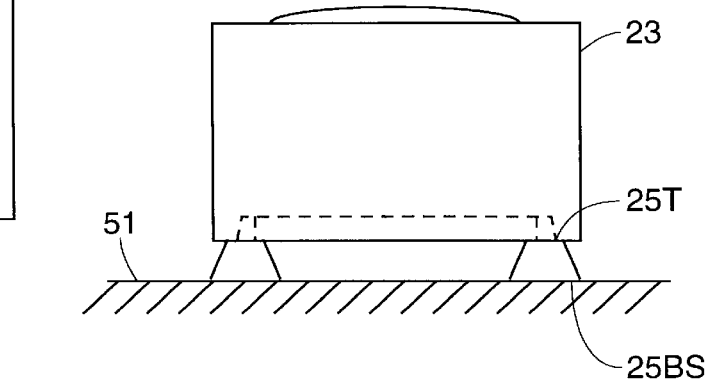
Fig. 4
Fig. 3
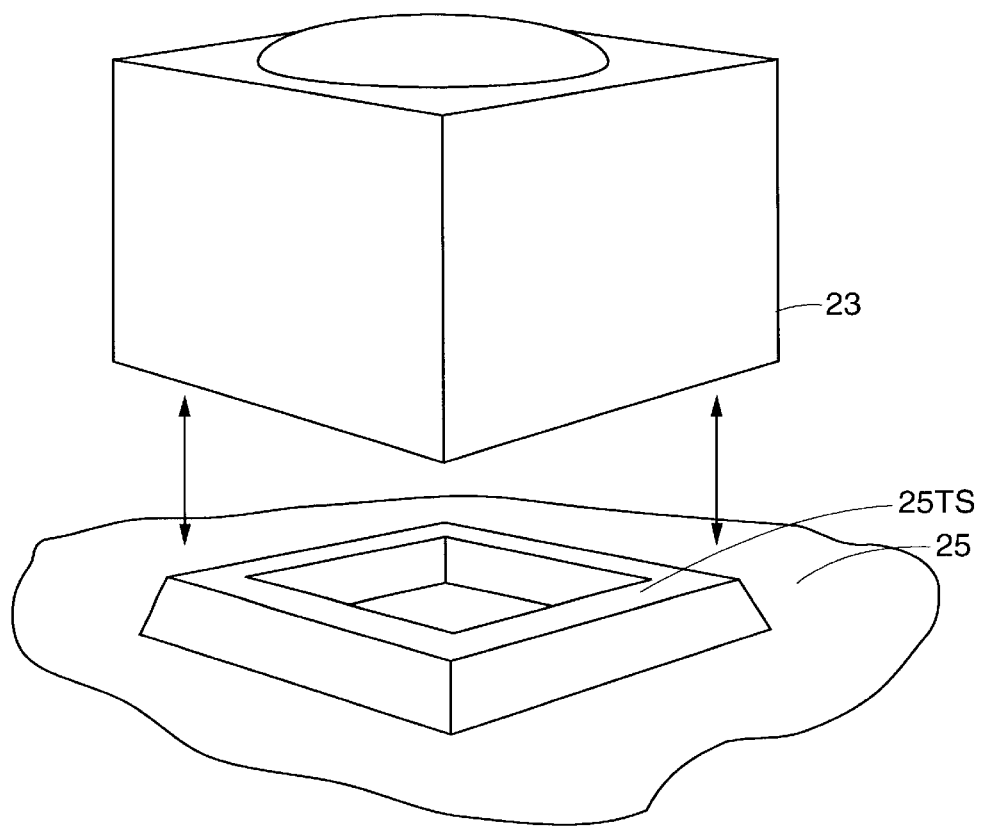

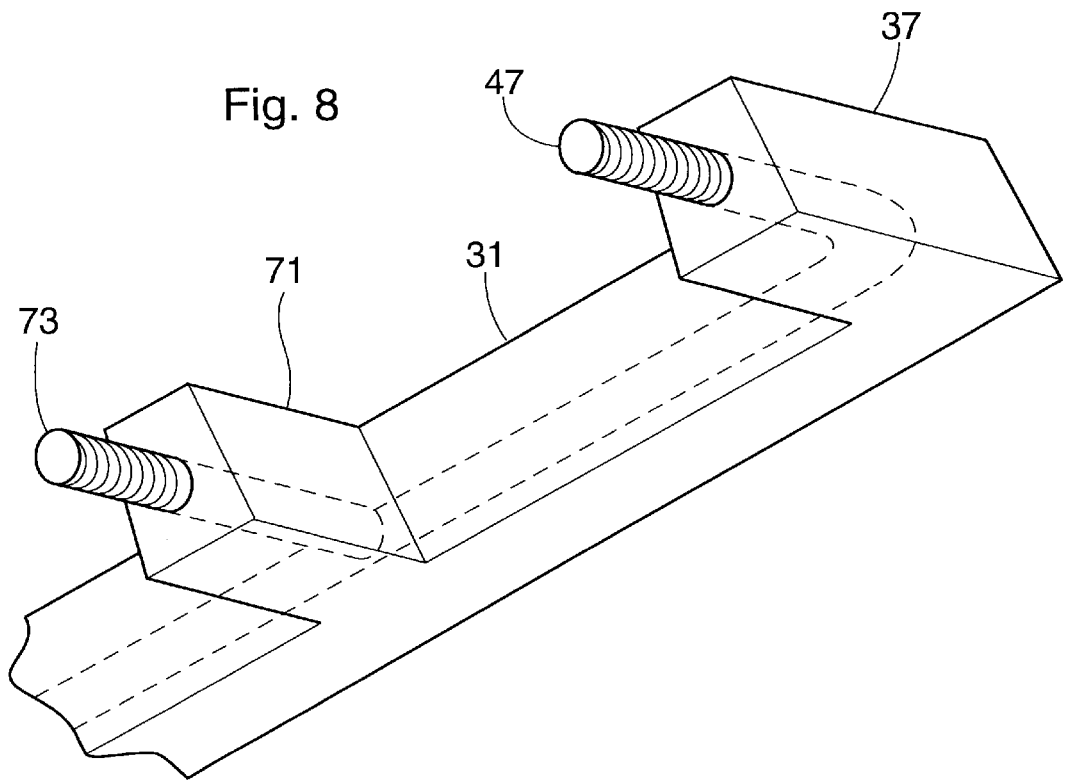
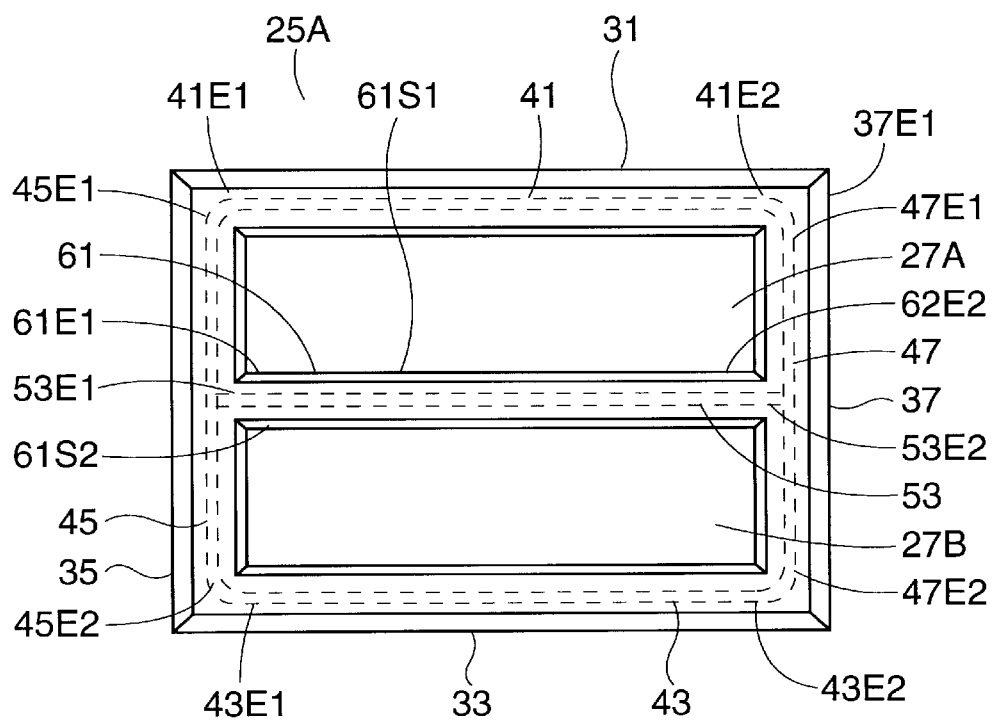

PAD FOR AIR CONDITIONER COMPRESSOR

BACKGROUND OF THE INVENTION

1. Field of the Invention

The invention relates to a pad for supporting an air conditioner compressor unit.

2. Description of the Prior Art

The conventional pads for supporting an outside air conditioner compressor unit is a solid concrete rectangle having metal rods embedded in the pad for support purposes. Although these pads are satisfactory in performing their function, they are expensive in that they require a relatively large amount of concrete or material.

SUMMARY OF THE INVENTION

It is an object of the invention to provide a new and unique pad for supporting an air conditioner compressor unit that can be made readily off the site and which uses a lesser amount of concrete compared to the solid concrete pads previously used.

The pad of the invention comprises a first set of spaced apart side members and a second set of spaced apart side members with the ends of adjacent members coupled together to form an opening between the four side members. Preferably the side members are formed of concrete. The side members have metal rods embedded therein with the ends of adjacent rods connected together.

One or two parallel connecting members with metal rods may be connected to either of the two sets of side members in the opening or crossed connecting members with metal rods may be connected together and to the two sets of side members in the opening.

In another embodiment, the members of the pad may be formed of a hard plastic material.

BRIEF DESCRIPTION OF THE DRAWINGS

FIG. 1 is a top plan view of a prior art pad.

FIG. 2 is a side view of the pad of FIG. 1.

FIG. 3 is an isometric view of a pad of the invention supported by the ground and showing an air conditioner compressor unit being lowered to rest on the top surface of the pad.

FIG. 4 is a side view of the pad of FIG. 1 supported by the ground with an air conditioner compressor unit resting on the top surface of the pad.

FIG. 5 is another embodiment of the pad of the invention.

FIG. 8 is a partial cross section of the pad of FIGS. 6 and 7.

DESCRIPTION OF THE PREFERRED EMBODIMENT

Referring now to FIGS. 1 and 2, there is illustrated a prior art concrete pad 21 used to support an air conditioner compressor unit which may be of the type shown at 23 in FIGS. 3 and 4. The pad 21 is a solid square having a given thickness and having reinforcing metal rods embedded therein.

Figure 9:
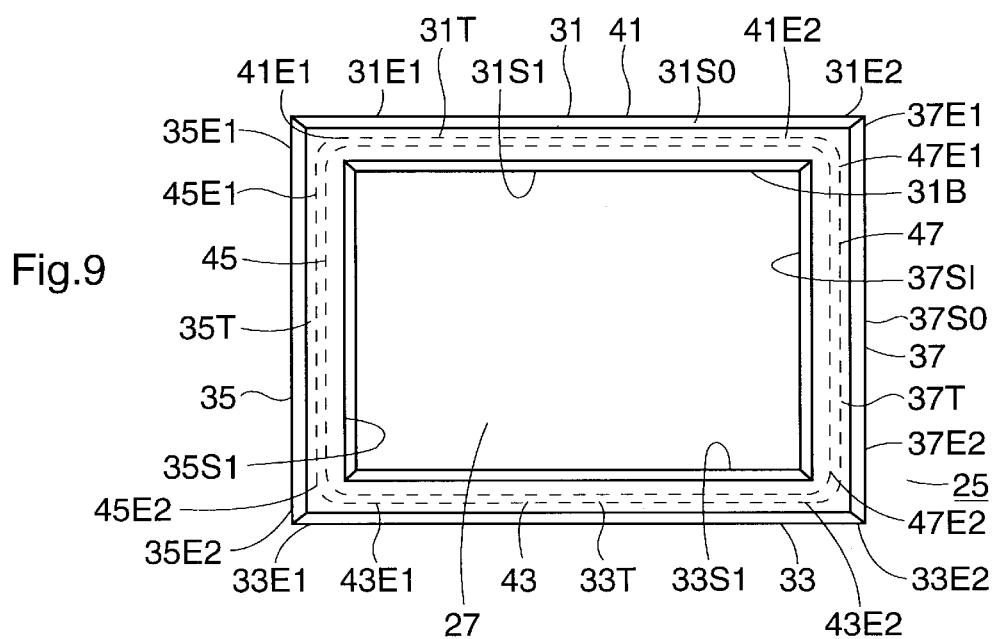
FIG. 9 is another embodiment of the pad of the invention.
Figure 10:
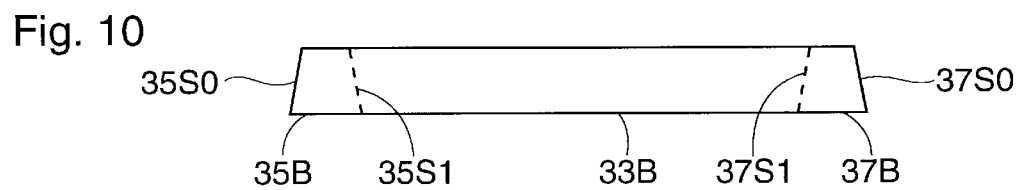
FIG. 10 is a side view of the pad of FIG. 9.
Figure 15:
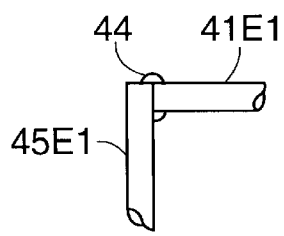
FIG. 15 illustrates two end metal support rods tack welded together.

Referring to FIG. 3, one embodiment of the pad of the invention is illustrated at 25. It is the same as the pad of FIGS. 9 and 10 except that it is square rather than having two longer sides. Reference will be had to FIGS. 9 and 10 for a description of the basic structure of the pads of the invention. The pad comprises two parallel side members 31 and 33 and two parallel side members 35 and 37. Members 31, 33, 35 and 37 have ends 31E1, 31E2; 33E1, 33E2; 35E1, 35E2; and 37E1, 37E2 respectively. Ends 31E1 and 35E1 are connected together; ends 31E2 and 37E1 are connected together; ends 33E1 and 35E2 are connected together; and ends 33E2 and 37E2 are connected together. The members 31, 33, 35, and 37 preferably are formed of concrete and have embedded therein metal support rods 41, 43, 45, and 47 respectively as shown in FIG. 5. Rod ends 41E1 and 45E1 are connected together; rod ends 41E2 and 47E1 are connected together; rod ends 43E1 and 45E2 are connected together and rod ends 43E2 and 47E2 are connected together. The rods 41, 47, 45 and 43 may be a single member bent in the form of a rectangle having two ends 41E1 and 45E1 tack welded together at 44 as shown in FIG. 15 or formed from four separate rods having their ends 41E1, 45E1; 41E2, 47E1; 43E1, 45E2; and 43E2, 47E2 respectively tack welded together. The members 31, 33, 35, 37 have a top surface 31T, 33T, 35T, 37T and a bottom surface 31B, 33B, 35B, 37B respectively defining the top and bottom surfaces 25TS an 25BS of the pad 25.

The side members 31, 33, 35, 37 have slanted inner sides 31SI, 33SI, 35SI, 37SI and slanted outer sides 31SO, 33SO, 35SO, 37SO respectively. Thus the bottom surfaces 31B, 33B, 35B, 37B have widths greater than that of the top surfaces 31T, 33T, 35T, 37T respectively.

The resulting pad 25 of FIGS. 9 and 10 has an opening 27 extending therethrough.

The pad 25 may be formed in a manufacturing facility by pouring wet concrete in a mold containing the support rods and after the pad has been properly formed, brought to the site where the ground 51 may be prepared by tamping and the bottom surface 25B placed on the ground 51 and the bottom of the air conditioner compressor unit 23 placed on the top surface 25TS of the pad 25 such that the pad 25 supports the unit 23. The concrete employed may be conventional concrete formed by mixing cement, sand, crushed rock or gravel, lightweight aggregate and water and allowing the mixture to set.

The pad of FIGS. 9 and 10 is the same as that of FIGS. 3 and 4 except the pad of FIGS. 9 and 10 has two longer sides and is not square as is the pad of FIGS. 3 and 4.

The pad 25A of FIG. 5 is the same as that of FIGS. 9 and 10 except it has a concrete connecting member 61 with ends 61E1 and 61E2 connected to the members 35 and 37 spaced from the members 31 and 33 to form two openings 27A and 27B through the pad. A metal support rod 53 has its ends 53E1 and 53E2 tack welded to the rods 45 and 47. The member 61 has two slanted side walls 61S1 and 61S2 such that in cross sections it is a truncated pyramid.

Figure 6:
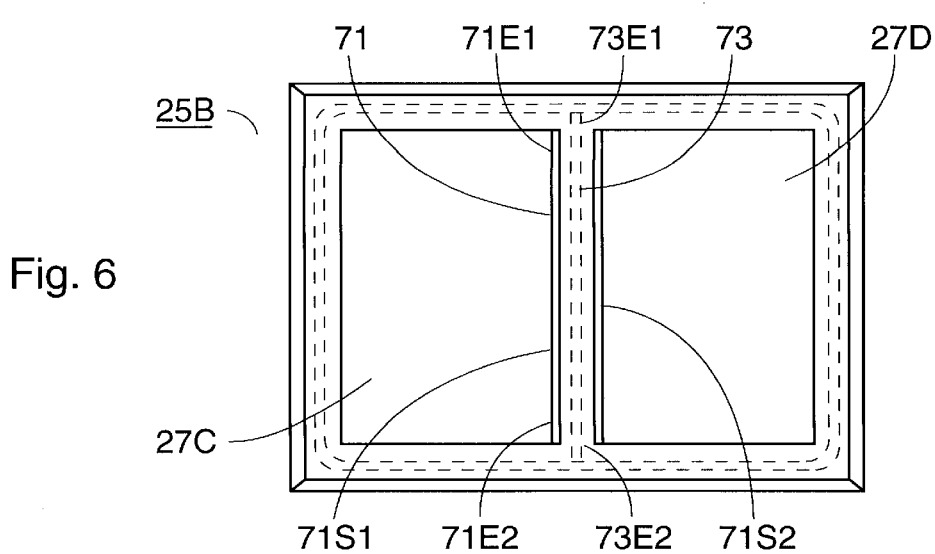
FIG. 6 is still another embodiment of the pad of the invention.
Figure 7:
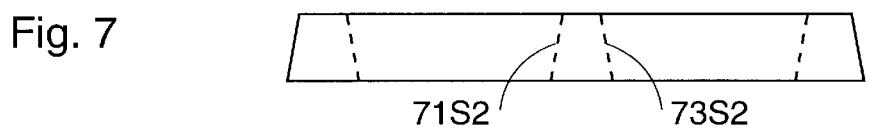
FIG. 7 is a side view of the pad of FIG. 6.
Figure 16:
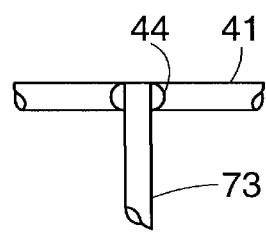
FIG. 16 illustrates a metal support rod tack welded to the intermediate section of a metal support rod.

The pad 25B of FIGS. 6 and 7 is the same as that of FIGS. 9 and 10 except it has a concrete connecting member 71 with ends 71E1 and 71E2 connected to the members 31 and 33 spaced from the members 35 and 37 to form two openings 27C and 27D through the pad. A metal support rod 73 has its ends 73E1 and 73E2 tack welded to the rods 41 and 43, for example as shown at 44 in FIGS. 16. The member 71 has two slanted side walls 71S1 and 73S2 such that in cross section it is a truncated pyramid.

Figure 11:
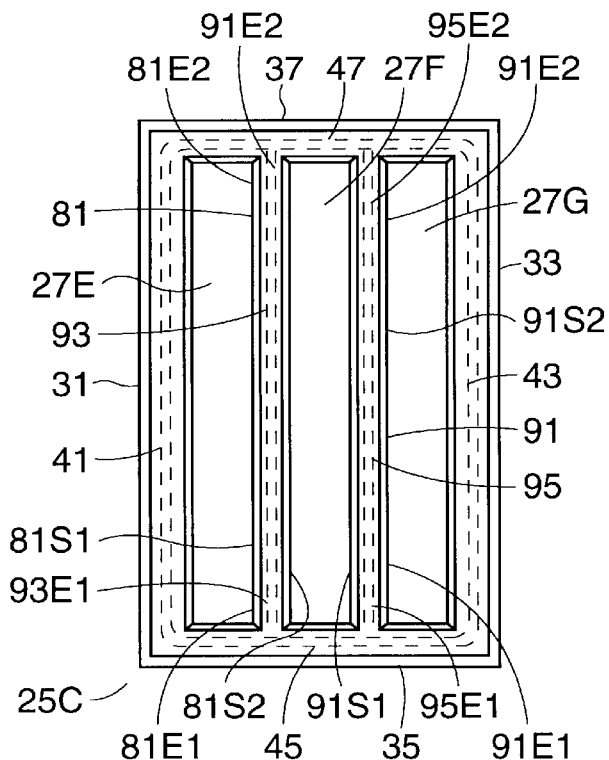
FIG. 11 is another embodiment of the pad of the invention.
Figure 12:
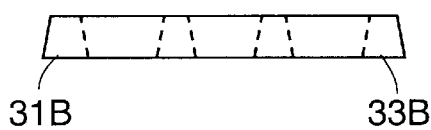
FIG. 12 is a side view of the pad of FIG. 11.

The pad 25C of FIGS. 11 and 12 is the same as that of FIGS. 9 and 10 except that it has two spaced apart concrete members 81 and 91 with ends 81E1, 81E2 and 91E1, 91E2 connected to the members 35 and 37 spaced from the members 31 and 33 to form three openings 27E, 27F, 27G through the pad. Metal support rods 93 and 95 have ends 93E1, 93E2 and 95E1, 95E2 tack welded to the rods 45 and 47. The members 81 and 91 each have two slanted side walls 81S1, 81S2 and 91S1, 91S2 such that in cross section, they are truncated pyramids.

Figure 13:
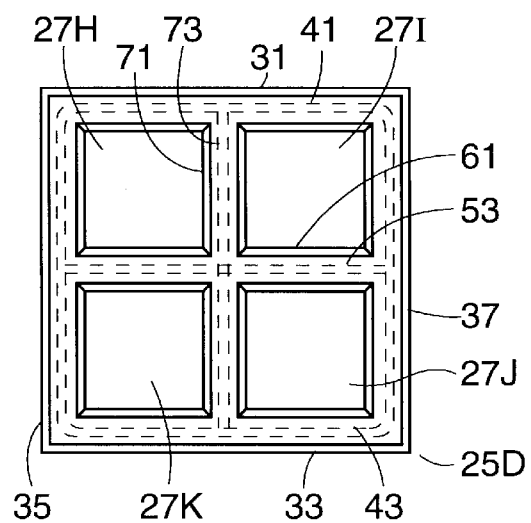
FIG. 13 is still another embodiment of the pad of the invention.
Figure 14:
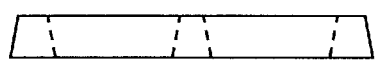
FIG. 14 is a side view of the pad of FIG. 13.

The pad 25D of FIGS. 13 and 14 is the same as that of FIG. 5 except that the members 31, 33, and 61 are shorter such that the pad is in the shape of a square. It has the concrete connecting member 71 with ends 71E1 and 71E2 connected to the members 31 and 33 spaced from the members 35 and 37 to form four openings 27H, 27I, 27J, 27K through the pad. The metal support rod 73 has its ends 73E1 and 73E2 tack welded to the rods 41 and 43. The mid point of the rod 73 is tack welded to the mid point of the rod 53.

The pads of FIGS. 3–13 are used in the same manner to support the unit 23. The particular pad used depends on the shape and weight of the unit 23. The pads may be formed at a manufacturing facility and brought to the site where the ground 51 may be prepared by tamping and the bottom surface 25BS of the pad placed on the ground 51 and the bottom of the unit 23 placed on the top surface 25TS of the pad such that the pad supports the unit 23.

In the embodiment of FIGS. 5, 6, 7, 9, 10 the exterior of the four pads may have dimensions of 36"×30". The members 31, 33, 35, 37 of FIGS. 5, 6, 7, and 9–14 each may have a height of 3", a bottom width of 1½" and a top width of 3".

In the embodiment of FIGS. 11 and 12 the exterior dimensions of the pad may be 36"×48" and in the embodiment of FIGS. 13 and 14, the exterior dimensions of the pad may 36"×36".

The metal support rods may be formed of iron with an outside diameter of ⅜".

It is to be understood that the components of the pad of the invention may have dimensions different from those listed above.

The pads of FIGS. 3–7 and 9–14 may be formed of other types of suitable materials that can be molded or cast into the configurations disclosed. For example the pads may be formed of a hard plastic such as hard PVC. If the pads are formed of hard PVC, the metal support rods may not be needed.

I claim:

1. A pad for an air conditioner compressor unit, comprising:

first and second spaced apart side members and third and fourth spaced apart side members, each of said side members having opposite first and second ends with said first and second ends of said first side member being connected to said first ends of said third and fourth side members, respectively and with said first and second ends of said second side member being connected to said second ends of said third and fourth side members respectively, at least a first connecting member connected between said first and second side members spaced from said third and fourth side members and at least a second connecting member connected between said third and fourth side members spaced from said first and second side members, said second connecting member being connected to said first connecting member such that an open space is formed between said first and second connecting members and said first and third side members, an open space is formed between said first and second connecting members and said first and fourth side members, an open space is formed between said first and second connecting members and said second and third side members and an open space is formed between said first and second connecting members and said second and fourth side members.

2. The pad of claim 1, wherein:

said pad has a bottom side and a top side, said bottom side being supported by a surface, and an air conditioner compressor unit having a bottom side supported by said top side of said pad.

3. A pad for an air conditioner compressor unit, comprising:

first and second spaced apart side members and third and fourth spaced apart side members, each of said side members having first and second opposite ends with said first and second opposite ends of said first side member being connected to said first ends of said third and fourth side members, respectively and with said first and second opposite ends of said second side member being connected to said second ends of said third and fourth side members respectively such that an open space is formed between said first, second, third, and fourth side members, and first, second, third and fourth metal rod members embedded in said first, second, third, and fourth side members respectively, each of said rod members having first and second opposite ends with said first and second opposite ends of said first rod member being connected to said first ends of said third and fourth rod members respectively and with said first and second opposite ends of said second rod member being connected to said second ends of said third and fourth rod members respectively.

4. The pad of claim 3, wherein:

said first, second, third, and fourth side members are formed of concrete.

5. A The pad of claim 4, wherein:

said pad has a bottom side and a top side, said bottom side being supported by a surface, and an air conditioner compressor unit having a bottom side supported by said top side of said pad.

6. The pad of claim 3, wherein:

said pad has a bottom side and a top side, said bottom side being supported by a surface, and an air conditioner compressor unit having a bottom side supported by said top side of said pad.

7. A pad for an air conditioner compressor unit comprising:

first and second spaced apart side members and third and fourth spaced apart side members, each of said side members having first and second opposite ends with said first and second opposite ends of said first side member being connected to said first ends of said third and fourth side members, respectively and with said first and second opposite ends of said second side member being connected to said second ends of said third and fourth side members respectively, first, second, third and fourth metal rod members embedded in said first, second, third, and fourth side members respectively, each of said rod members having first and second opposite ends with said first and second opposite ends of said first rod member being connected to said first ends of said third and fourth rod members respectively and with said first and second opposite ends of said second rod member being connected to said second ends of said third and fourth rod members respectively, at least a first connecting member connected between said first and second side members spaced from said third and fourth side members such that an open space is formed between said first, second and third side members and said first connecting member and an open space is formed between said first, second and fourth side members and said first connecting member, a metal support rod embedded in said first connecting member, said metal support rod embedded in said first connecting member having opposite ends connected to said first and second metal rod members respectively.

8. The pad of claim 7, wherein:

said first, second, third, and fourth side members and said first connecting member are formed of concrete.

9. The pad of claim 8, wherein:

said pad has a bottom side and a top side, said bottom side being supported by a surface, and an air conditioner compressor unit having a bottom side supported by said top side of said pad.

10. The pad of claim 7, wherein:

said pad has a bottom side and a top side, said bottom side being supported by a surface, and an air conditioner compressor unit having a bottom side supported by said top side of said pad.

11. A pad for an air conditioner compressor unit, comprising:

first and second spaced apart side members and third and fourth spaced apart side members, each of said side members having first and second opposite ends with said first and second opposite ends of said first side member being connected to said first ends of said third and fourth side members, respectively and with said first and second opposite ends of said second side member being connected to said second ends of said third and fourth side members respectively, first, second, third and fourth metal rod members embedded in said first, second, third, and fourth side members respectively, each of said rod members having first and second opposite ends with said first and second opposite ends of said first rod member being connected to said first ends of said third and fourth rod members respectively and with said first and second opposite ends of said second rod member being connected to said second ends of said third and fourth rod members respectively, at least a first connecting member connected between said first and second side members spaced from said third and fourth side members, a metal support rod embedded in said first connecting member, said metal support rod embedded in said first connecting member having opposite ends connected to said first and second metal rod members respectively, at least a second connecting member connected between said third and fourth side members spaced from said first and second side members, said second connecting member being connected to said first connecting member such that an open space is formed between said first and second connecting member and said first and third side members, an open space is formed between said first and second connecting members and said first and fourth side members, an open space is formed between said first and second connecting members and said second and third side members and an open space is formed between said first and second connecting members and said second and fourth side members, a metal support rod embedded in said second connecting member and connected to said third and fourth rod members and to said metal support rod embedded in said first connecting member.

12. The pad of claim 11, wherein:

said first, second, third, and fourth side members and said first and second connecting members are formed of concrete.

13. The pad of claim 12, wherein:

said pad has a bottom side and a top side, said bottom side being supported by a surface, and an air conditioner compressor unit having a bottom side supported by said top side of said pad.

14. The pad of claim 11, wherein:

said pad has a bottom side and a top side, said bottom side being supported by a surface, and an air conditioner compressor unit having a bottom side supported by said top side of said pad.

* * * * *